United States Patent
Shimazaki

(10) Patent No.: US 8,015,321 B2
(45) Date of Patent: *Sep. 6, 2011

(54) COMPUTER, IO EXPANSION DEVICE AND METHOD FOR RECOGNIZING CONNECTION OF IO EXPANSION DEVICE

(75) Inventor: Haruo Shimazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/153,016

(22) Filed: May 12, 2008

(65) Prior Publication Data

US 2008/0228954 A1  Sep. 18, 2008

Related U.S. Application Data

(63) Continuation of application No. 11/135,427, filed on May 24, 2005, now Pat. No. 7,814,256.

(30) Foreign Application Priority Data

Feb. 7, 2005 (JP) .................................. 2005-029999

(51) Int. Cl.
*G06F 13/14* (2006.01)
*G06F 3/00* (2006.01)
*G06F 13/00* (2006.01)

(52) U.S. Cl. ............. 710/16; 710/15; 710/300; 710/305
(58) Field of Classification Search ..................... 710/16, 710/2

See application file for complete search history.

(56) References Cited

U.S. PATENT DOCUMENTS

| | | | |
|---|---|---|---|
| 5,754,769 | A | 5/1998 | Harris, Jr. et al. |
| 5,754,796 | A | 5/1998 | Wang et al. |
| 6,633,947 | B1 | 10/2003 | Holman et al. |
| 6,963,562 | B1 | 11/2005 | McRobert |
| 2002/0112198 | A1* | 8/2002 | Lim et al. ........................... 714/7 |
| 2002/0131362 | A1* | 9/2002 | Callon ........................ 370/216 |
| 2003/0006992 | A1 | 1/2003 | Mino et al. |
| 2004/0205279 | A1 | 10/2004 | Ohnishi |
| 2004/0230711 | A1 | 11/2004 | Moon et al. |
| 2005/0038922 | A1 | 2/2005 | Yamamoto et al. |
| 2005/0099962 | A1 | 5/2005 | Matsuda |
| 2006/0134936 | A1* | 6/2006 | Sullivan et al. ................. 439/61 |

(Continued)

FOREIGN PATENT DOCUMENTS

EP  1 187 033 A2  3/2002

(Continued)

OTHER PUBLICATIONS

European Search Report, dated Jun. 6, 2006.

(Continued)

*Primary Examiner* — Chun-Kuan Lee
*Assistant Examiner* — Brooke J Dews
(74) *Attorney, Agent, or Firm* — Staas & Halsey LLP

(57) ABSTRACT

A computer main unit and a PCI_Box (#0) are connected to each other in a loop connection manner by two paths. A first path is formed of an SMBus and a PCI_Box connection cable and a second path is formed of another PCI_Box connection cable. A monitoring and control unit (MMB) recognizes a connection path by reading out, through the second path, connection setting information written to the PCI_Box (#0) via the first path.

4 Claims, 10 Drawing Sheets

U.S. PATENT DOCUMENTS

2008/0228954 A1 9/2008 Shimazaki

FOREIGN PATENT DOCUMENTS

| JP | 59-081752 | 5/1984 |
|---|---|---|
| JP | 1-155452 | 6/1989 |
| JP | 02-133848 | 5/1990 |
| JP | 08249248 | 9/1996 |
| JP | 2002-278909 | 9/2002 |

OTHER PUBLICATIONS

Office Action for parent U.S. Appl. No. 11/135,427; mailed Nov. 1, 2007.

Office Action for parent U.S. Appl. No. 11/135,427; mailed Aug. 5, 2008.

Advisory Action for parent U.S. Appl. No. 11/135,427; mailed Nov. 21, 2008.

Office Action for parent U.S. Appl. No. 11/135,427; mailed Feb. 20, 2009.

Japanese Office Action issued Apr. 27, 2010 in corresponding Japanese Patent Application 2005-029999.

Notice of Allowance mailed Jun. 10, 2010 in co-pending parent U.S. Appl. No. 11/135,427.

* cited by examiner

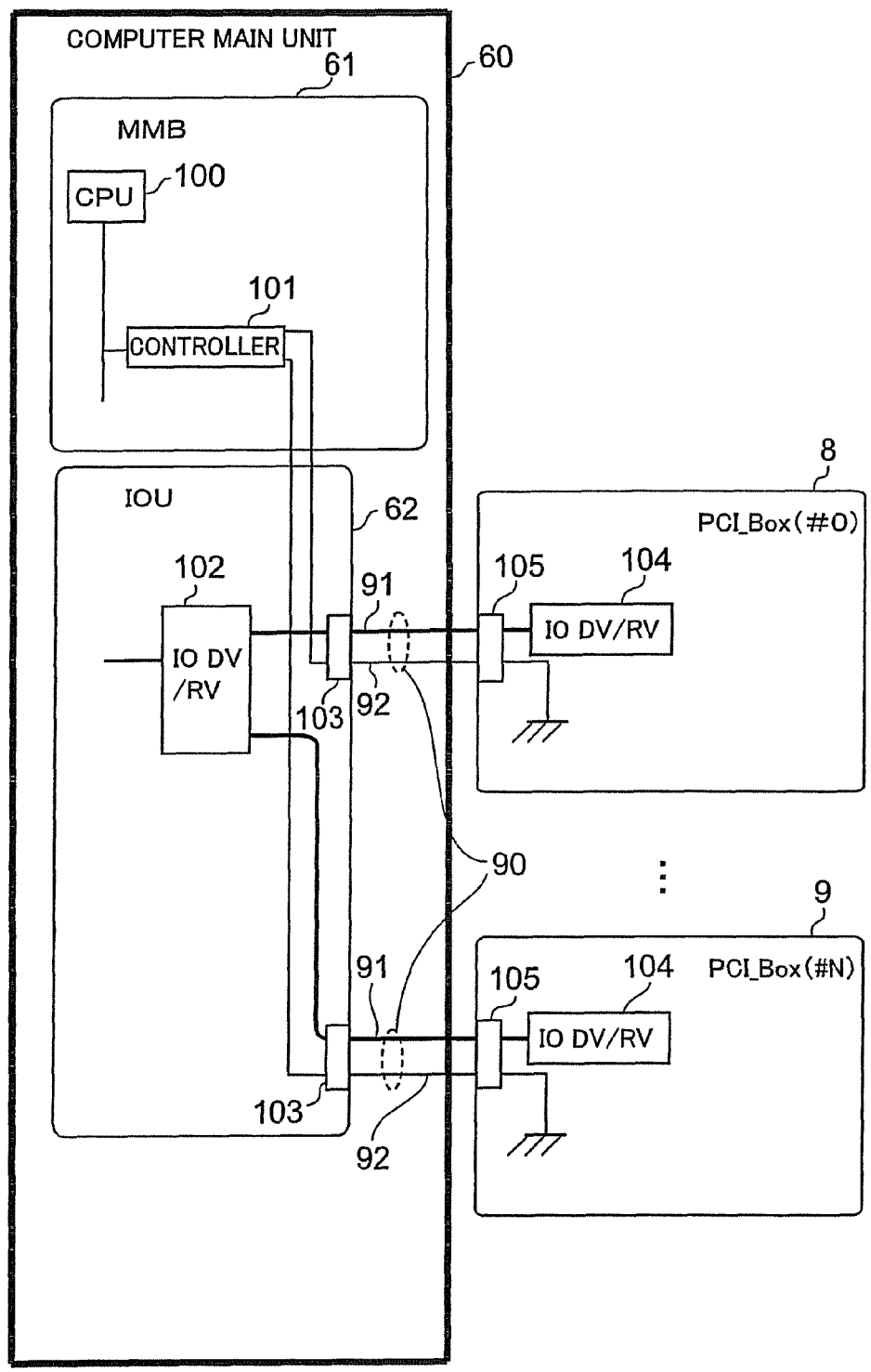

COMPUTER, IO EXPANSION DEVICE AND METHOD FOR RECOGNIZING CONNECTION OF IO EXPANSION DEVICE

CROSS-REFERENCE TO RELATED APPLICATIONS

This application is a Continuation application based on prior U.S. application Ser. No. 11/135,427, filed on May 24, 2005 now U.S. Pat. No. 7,814,256 and hereby claims priority to Japanese Application No. 2005-029999 filed Feb. 7, 2005, the contents of which are hereby incorporated herein by reference.

BACKGROUND OF THE INVENTION

1. Field of the Invention

The present invention relates generally to a technique of recognizing a connection between a computer main unit and an input/output (IO) expansion device and, more particularly, to a computer, an IO expansion device and a method for recognizing a connection of IO expansion device to realize connection or disconnection between a computer main unit and an IO expansion device on a partition-by-partition basis.

2. Description of the Related Art

In recent years, the development of multiprocessor-type computer servers has been pursued. There is now a tendency to increase the scale of multiprocessor-type computer servers. There is also a demand for server systems capable of fine partitioning for operating a plurality of CPUs on a job-by-job basis and capable of offering various services.

Because of the demand for such servers and systems, recent external IO functions need compatibility with flexible partitioning. In some cases, a function deficiency occurs at the time of fine partitioning if IO functions in a computer main unit alone are used. Therefore, there is a need to add IO functions by providing an IO function expansion device such as PCI_Box.

FIG. 10 is a diagram showing connections between a computer main unit and function expansion devices used in a conventional system. Each IO function expansion device is a PCI_Box. Referring to FIG. 10, the computer main unit 60 includes a supervisory control unit (management board (MMB)) 61 and an IO unit (IOU) 62.

MMB 61 has a CPU 100 and a controller 101 and performs supervisory control of the connection between the IOU 62 and PCI_Box (#0) 8 or PCI_Box (#N) 9. The number in the parentheses of PCI_Box (#0) 8 and the number in the parentheses of PCI_Box (#N) 9 are each an ID number for uniquely identifying the PCI_Box.

The IOU 62 has an IO driver/receiver (IO DV/RV) 102 and a connector 103. The IOU 62 is connected to each PCI_Box by a PCI_Box connection cable 90 indicated by a dotted line and the connector 103. The IO DV/RV 102 in the IOU 62 transmits a main IO signal from the computer main unit 60 to each PCI_Box.

The PCI_Box connection cable 90 is formed of a main signal line 91 and a PCI_Box implementation signal line 92. The main signal line 91 is a signal line used when the IO main signal is transmitted to one PCI_Box from the computer main unit 60. The PCI_Box implementation signal line 92 is a signal line used when a PCI_Box implementation signal indicating a state where one PCI_Box is connected to or disconnected from the IOU 62 is transmitted from the PCI_Box to the MMB 61. The PCI_Box implementation signal line 92 is a one-way serial communication line.

Each of the PCI_Box (#0) 8 and PCI_Box (#N) 9 has an IO DV/RV 104 and a connector 105. A PCI card is connected to the IO DV/RV 104.

In the conventional system shown in FIG. 10, one PCI_Box (#0) 8 or PCI_Box (#N) 9 is used in correspondence with a unit partition.

Supervisory control processing in a case where the PCI_Box (#0) 8 is connected to the IOU 62 will be described by way of example. When the connector 105 of the PCI_Box (#0) 8 is connected to the connector 103 in the IOU 62 via the PCI_Box connection cable 90, the PCI_Box implementation signal is transmitted from the PCI_Box (#0) 8 to the controller 101 in the MMB 61 via the PCI_Box implementation signal line 92.

The controller 101 in the MMB 61 receives the PCI_Box implementation signal from the PCI_Box (#0) 8 and establishes a connection between the IOU 62 and the PCI_Box (#0) 8.

When the MMB 61 detects interruption of the PCI_Box implementation signal from the PCI_Box (#0) 8, it determines that a connection abnormality has occurred.

A composite computer console apparatus arranged to implement a plurality of console input/output devices in one unit is described, for example, in Japanese Patent Laid-Open No. 59-81752. Also, a data bus check method of performing detection for checking whether or not there is an abnormality in a data bus in a control apparatus configured on a function-by-function basis is described, for example, in Japanese Patent Laid-Open No. 2-133848.

In the conventional system shown in FIG. 10, the PCI_Box (#0) 8 or the PCI_Box (#N) 9 has no function adapted for partitioning. In a conventional server, for example the PRIMEPOWER series (PRIMEPOWER: a registered trademark of Fujitsu Co., Ltd.), a system in which one PCI_Box is used in correspondence with a unit partition, as in the case of the conventional system shown in FIG. 10, is also adopted. No system capable of an operation including partitioning in a PCI_Box has been provided.

In the conventional system shown in FIG. 10, the PCI_Box implementation signal transmitted from each PCI_Box to the computer main unit 60 is transmitted over a one-way communication line, for example, the PCI_Box implementation signal line 92. Therefore, there is a problem that when a communication abnormality occurs between the computer main unit 60 and one PCI_Box, the time taken to identify a fault point corresponding to the cause of communication abnormality is considerably long.

For example, in the conventional method shown in FIG. 10, it is difficult to ascertain in which one of the communication paths in the PCI_Boxes, the communication paths between the PCI_Boxes and the IOU 62, the communication path in the IOU 62 and the communication path between the IOU 62 and the MMB 61 a fault point relating to communication abnormality exists.

In a case where a system different from the conventional system and capable of an operation including partitioning in a PCI_Box is adopted, a process for connection between the computer main unit and PCI_Boxes is required in which connections on a partition-by partition basis are established in a state where a connection between the computer main unit side and the PCI_Box side is established.

When a connection is added or removed between the computer main unit and the PCI_Boxes, there is a need to enable connection or disconnection on a partition-by partition basis.

There is also a need to enable connection or disconnection in correspondence with a partition to be added or removed, while partitions used in operation are maintained. Further, there is a need for a device for preventing an erroneous connection between the computer main unit and the PCI_Boxes to avoid an error in the operation of the system.

SUMMARY OF THE INVENTION

It is an object of the present invention to provide a computer, an IO expansion device and a method for recognizing a connection of IO expansion device capable of preventing erroneous connection between a computer main unit and PCI_Boxes provided as an IO expansion device, suitably monitoring and controlling connection or disconnection between the PCI_Boxes and the computer main unit on a partition-by-partition basis, and easily identifying the cause of a communication abnormality between the computer main unit and the PCI_Boxes at the time of occurrence of the communication abnormality.

To achieve the above-described object, according to the present invention, arrangements described below are adopted. That is, the present invention provides a computer capable of being connected to an IO expansion device to which at least an external IO device is connected. The computer comprises an IO unit including a first connection interface for connection to the IO expansion device, sending an output signal to the external IO device connected to the IO expansion device and receiving an input signal from the external IO device, and a monitoring and control unit including a second connection interface for connection to the expansion device and a third connection interface for connection to the IO unit, and monitoring and controlling a connection of the IO expansion device, wherein the monitoring and control unit includes connection setting information readout unit which reads out, at least by using the second interface, connection setting information written in a storage unit in the IO expansion device by using the third connection interface and the first connection interface.

The present invention also provides an IO expansion device connecting at least an external IO device to a computer. The IO expansion device comprises a first connector including a terminal to be connected to an IO unit provided in the computer and to output an output signal to the external IO device and to be inputted an input signal from the external IO device, a second connector for connection to a monitoring and control unit provided in the computer, and a connection setting information holding unit holding connection setting information written through the first connector, and reading out the connection setting information at least through the second connector.

According to the present invention, in the computer, it is possible to recognize the state of the IO expansion device being correctly corrected to the computer.

Preferably, in the present invention, the IO expansion device further comprises a plurality of the first connectors in correspondence with an IO expansion module which is detachably attached according to a partition configuration of the computer, and to which the external IO device is connected, wherein the connection setting information holding unit holds connection setting information corresponding to each of the plurality of first connectors.

According to the present invention using the above-described arrangement, prevention of erroneous connection between the computer and the IO expansion device can be achieved with respect to each partition. Also, according to the present invention, connection/disconnection between the computer and the IO expansion device can be performed on a partition-by-partition basis.

Preferably, in the IO expansion device of the present invention, at least one of the first connector and the second connector includes a terminal through which an interrupt signal is sent to the computer at least when the connection to the computer is established.

According to the present invention using the above-described arrangement, a connection can be established between an IO expansion device and the computer even if the IO expansion device is newly connected to the computer without making any connection setting in advance.

The present invention also provides a method for recognizing a connection between a computer and an IO expansion device connecting at least an external IO device to the computer. The computer comprises an IO unit including an interface for connection to the IO expansion device, sending an output signal to the external IO device connected to the IO expansion device and receiving an input signal from the external IO device, and a monitoring and control unit including an interface for connection to the IO expansion device and monitoring and controlling the connection of the IO expansion device. The IO expansion device comprises an interface for connection to the IO unit, and an interface for connection to the monitoring and control unit. The method comprises transmitting, in the monitoring and control unit, a connection setting signal for setting the connection between the IO unit and the IO expansion device to the IO expansion device through the interface for connection between the monitoring and control unit and the IO unit and through the interface for connection between the IO unit and the IO expansion device on the basis of connection setting information on a setting of connection between the IO unit and the IO expansion device stored in advance in the monitoring and control unit, receiving, in the IO expansion device, the connection setting signal from the monitoring control unit and recording a connection state information on the state of connection between the IO unit and the IO expansion device, and obtaining, in the monitoring and control unit, the connection state information recorded by the IO expansion device by reading the connection state information at least through the interface for connection between the monitoring and control unit and the IO expansion device, and recognizing the connection between the IO unit and the IO expansion device on the basis of the result of comparison between the obtained connection state information and the connection setting information stored in advance. According to the present invention, erroneous connection between the computer and the IO expansion devices can be prevented.

Preferably, in the present invention, the above-described method further comprises sending an interrupt signal to the computer, in the IO expansion device, at least when the connection to the computer is established.

In the present invention, a monitoring and control circuit for controlling an IO expansion device (for example PCI_Box) which are connected to a computer main unit is implemented as a comparatively simple piece of hardware at a low cost to monitor the states of connections between the computer main unit and the PCI_Boxes.

That is, in the present invention, a communication path through which a monitoring and control unit (for example MMB) and PCI_Boxes are connected via an IO unit (IOU) and a communication path through which the MMB and the PCI_Boxes are directly connected to each other are provided and the entire system is formed in a loop configuration.

According to the present invention, therefore, it is possible to determine in which one of the communication path between the MMB and the IOU, the communication paths between the IOU and the PCI_Boxes and the communication paths between the MMB and the PCI_Boxes a fault point relating to a communication abnormality between the IOU and the PCI_Boxes exists at the time of occurrence of the communication abnormality.

In the present invention, for example, a connection setting signal is transmitted from the IOU to the devices capable of bidirectional communication in the PCI_Boxes under the control of the MMB, and information on each of the logics of the bits at the positions corresponding to ID number for IO expansion module (for example PCIU) connected to the IOU is stored in a register. The MMB compares register information with connection setting information. If the result of this comparison coincides with connection setting information from the IOU, the MMB determines that communication with the computer main unit and the PCIU can be started.

Thus, according to the present invention, connection/disconnection between the computer main unit and the PCI_Boxes can be performed on a partition-by-partition basis. Also, prevention of erroneous connection between the computer and the IO expansion device can be achieved with respect to each partition.

Also, according to the present invention, when a connection between the computer main unit and the PCI_Boxes is added or removed, the connection or disconnection corresponding to a partition to be added or removed can be performed, while the connections with respect to the partitions in operation are being maintained.

Also, according to the present invention, as described afterward, the MMB determines which PCIU has been connected to or disconnected from the IOU by cable connection or cable disconnection on the basis of the bit logic on an interrupt pin assigned to the device capable of bidirectional communication in the IOU.

According to the present invention, therefore, the connection between the IOU and a PCIU newly connected to the IOU by cable connection can be established even if this PCIU is not identified from the information in the MMB on the settings of connections between the IOU and the PCIUs.

BRIEF DESCRIPTION OF THE DRAWINGS

FIG. 10 is a diagram showing connections between a computer main unit and PCI_Boxes used in a conventional system.

DETAILED DESCRIPTION OF THE PREFERRED EMBODIMENTS

Embodiments of the present invention will be described with reference to the accompanying drawings. In the following, an example of use of a PCI_Box as an IO expansion device will be described. The PCI_Box is a PCI card expansion unit for expansion of an external IO function.

Figure 1:
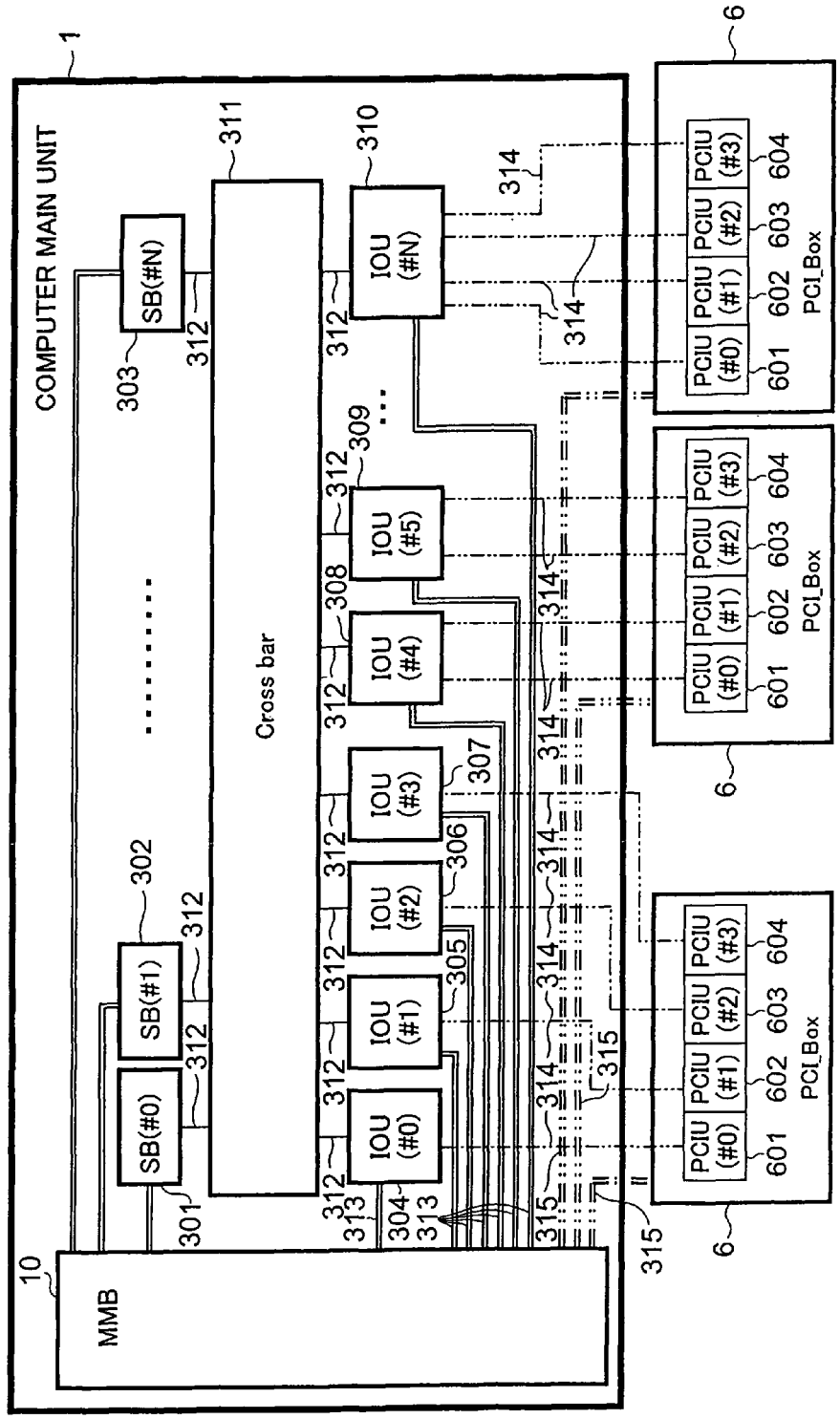
FIG. 1 is a diagram showing an example of an entire configuration of a system in accordance with the present invention.

FIG. 1 is a diagram showing an example of an entire configuration of a system in accordance with the present invention. A computer main unit 1 shown in FIG. 1 includes system boards (SBs) (#0) 301 to (#N) 303. Each system board is a unit having a CPU and a memory incorporated therein. Numbers in parentheses ("#0" to "#N") are ID numbers for the SBs.

IOUs (#0) 304 to (#N) 310 are IO units incorporating a hard disk drive (HDD) and a PCI card. Numbers in parentheses ("#0" to "#N") are ID numbers for the IOUs.

A cross bar 311 is a unit incorporating an LSI which establishes connection between the SBs and the IOUs. The cross bar 311 can flexibly change a partition configuration using the SBs and the IOUs. The cross bar 311 is capable of connecting a plurality of the IOUs to one SB, connecting one IOU to a plurality of the SBs, and connecting any one of the SBs to one of the IOUs.

An MMB 10 is a unit which monitors and controls connections between the computer main unit 1 and PCI_Boxes 6.

Paths 312 are main signal paths through which the units are connected to each other by using a printed circuit board and connectors. Paths 313 are paths for monitor and control signal, connecting the MMB and the units using printed boards and connectors. Paths 314 are cable paths through which the IOUs and the PCI_Boxes are connected to each other for communication of a main signal and a control signal. Paths 315 are cable paths through which the MMB 10 and the PCI_Boxes are connected to each other for communication of a monitor signal and a control signal.

PCI_Boxes 6 which are IO devices provided outside the computer main unit 1 respectively have PCI units (PCIUs) (#0) 601 to (#3) 604.

The MMB 10 monitors and controls all the units incorporated in the computer main unit 1.

Each PCI_Box 6 is used as a PCI expansion slot for some of the IOUs. Connections via cables are made between the IOUs and the PCI_Boxes 6 on a PCIU-by-PCIU basis. One IOU may be connected to one PCI_Box 6 and a plurality of IOUs may be connected to one PCI_Box 6.

Figure 2:
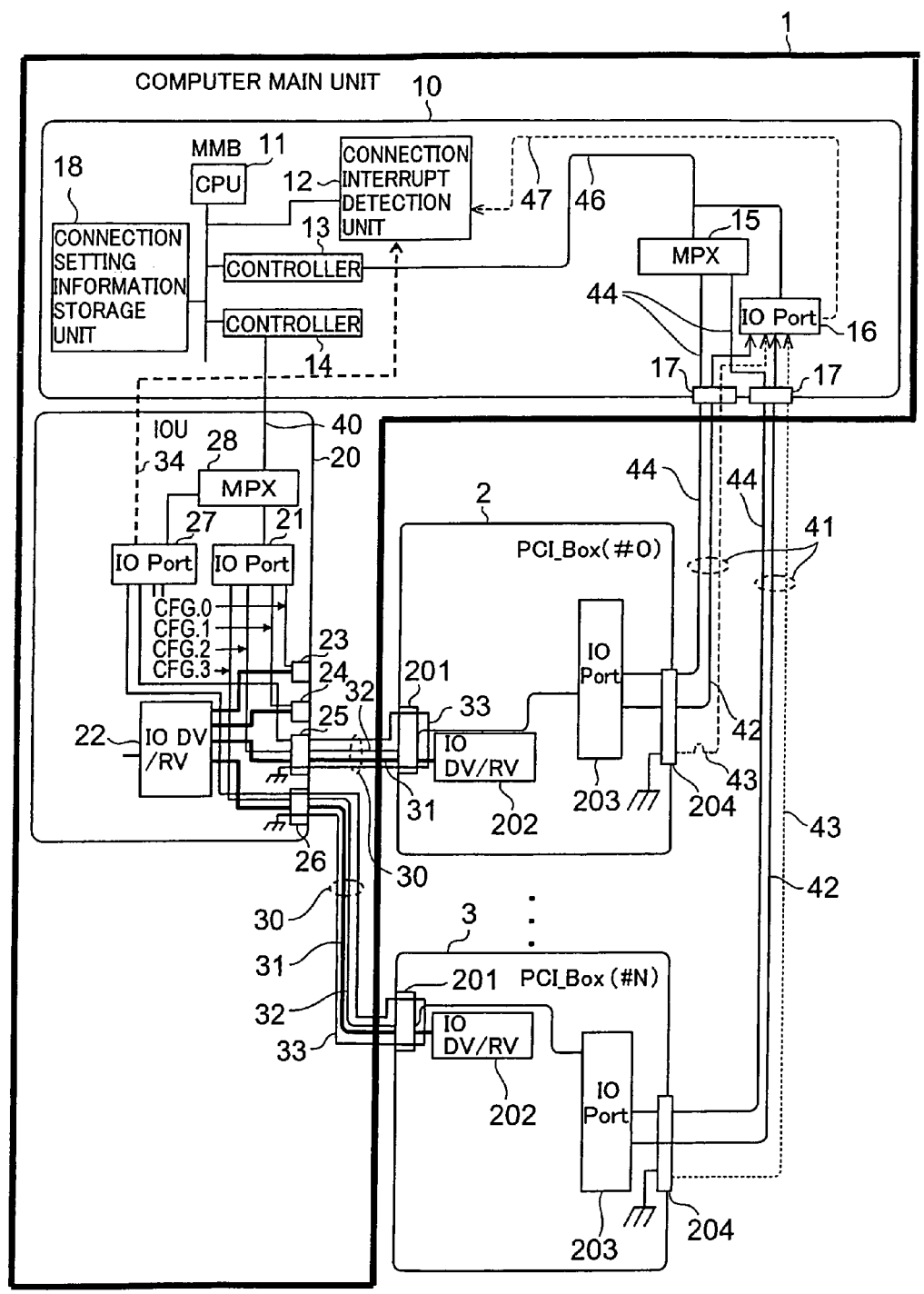
FIG. 2 is a diagram showing an example of a configuration of an IO device connection recognition system in accordance with the present invention.

The first embodiment of the present invention will be described with reference to FIG. 2. FIG. 2 is a diagram showing an example of a configuration of an IO device connection recognition system in accordance with the present invention. The first embodiment will first be outlined. In the first embodiment, an IO unit (IOU) 20 and the MMB 10 capable of monitoring and controlling connections to one PCI_Box or a plurality of PCI_Boxes provided outside the computer main unit 1 are incorporated in the computer main unit 1.

Communication paths for connection between the MMB 10 and the PCI_Boxes via the IOU 20 and communication paths for direct connection between the MMB 10 and the PCI_Boxes are provided and the entire system is formed in a loop configuration.

A device capable of bidirectional communication is incorporated in each of the MMB 10, the IOU 20 and the PCI- _Boxes. Bidirectional communication is performed between the MMB 10 and the PCI_Boxes via the IOU 20, and direct communication is also performed between the MMB 10 and the PCI_Boxes.

The MMB 10 transmits a connection setting signal for connection between the IOU 20 and one of the PCI_Boxes to the PCI_Box via the IOU 20. In each PCI_Box, the connection setting signal is transmitted to the device in the PCI_Box which is connected to the IOU 20. The device is capable of communicating bidirectionally.

The device capable of bidirectional communication in each PCI_Box receives the connection setting signal from the IOU 20 and records information on the state of connection to the IOU 20. The device capable of bidirectional communication in each PCI_Box transmits the recorded connection state information to the MMB 10.

The MMB 10 compares the connection state information received from the PCI_Box with an connection setting information set in advance in the MMB 10 as information on a setting of connection between the IOU 20 and the PCI_Box. If the connection state information and the connection setting information match each other, the MMB 10 determines that the connection between the IOU 20 and the PCI_Box is normal and enables initiation of communication between the computer main unit 1 and the PCI_Box. If the connection state information and the connection setting information do not match each other, the MMB 10 determines that the connection between the IOU 20 and the PCI_Box is abnormal and disables initiation of communication between the computer main unit 1 and the PCI_Box.

The first embodiment of the present invention will be described in more detail with respect to a concrete example thereof. Referring to FIG. 2, the computer main unit 1 includes the MMB 10 and the IOU 20. The MMB 10 monitors and controls the connection between the IOU 20 and the PCI_Box (#0) 2 or between the IOU 20 and the PCI_Box (#N) 3 and the connections between the MMB 10 and the PCI_Boxes.

The MMB 10 includes a central processing unit (CPU) 11, a connection interrupt detection unit 12, controllers 13 and 14, a multiplex (MPX) 15, an IO port 16, connectors 17 and a connection setting information storage unit 18.

The controllers 13 and 14 and the MPX 15 are devices for bidirectional communication. The controllers 13 and 14 control each of the connections between the computer main unit 1 and the PCI_Boxes according to a direction from the CPU 11.

The MPX 15 multiplexes signals received from the PCI_Boxes, transmits the multiplexed signals to the controller 13, demultiplexes a signal received from the controller 13, and transmits the demultiplexed signal to the PCI_Boxes. Since the MPX 15 is used, the number of cables between the controller 13 and the MPX 15 is limited to one, thus achieving a reduction in cost.

The connection interrupt detection unit 12 detects a connection interrupt signal transmitted from the IO port 16 via a connection interrupt signal line 47 or a connection interrupt signal transmitted from an IO port 27 in the IOU 20 via a connection interrupt signal line 34.

An Interrupt pin is assigned to the IO port 16. A bit logic on the interrupt pin exists with respect to each of the cable connection relationships between the MMP 10 and the PCI_Boxes. The MMB 10 can determine the state of cable connection between the MMB 10 and the PCI_Box on the basis of the bit logic on the interrupt pin.

When one PCI_Box is newly connected to the MMB 10 by cable connection, the IO port 16 receives the connection interrupt signal via a connection interrupt signal line 43 from the PCI_Box newly connected by cable connection. The IO port 16 then transmits the connection interrupt signal to the connection interrupt detection unit 12 via the connection interrupt signal line 47.

In the connection setting information storage unit 18, a connection setting information which is an information on the settings of connections between the IOU 20 and the PCI_Boxes is held. The configuration of data in the connection setting information storage unit 18 will be described below.

The IOU 20 includes IO ports 21 and 27, an MPX 28, an IO DV/RV 22 and connectors 23 to 26.

The IO port 21 is a bidirectional communication device which transmits or receives signals to or from the MMB 10 via the MPX 28 and a system management bus (SMBus) 40. The IO DV/RV 22 is a device which transmits a main IO signal from the computer main unit 1 to each PCI_Box. The IO port 27 is a device which holds information on established/nonestablished states of cable connections between the PCI_Boxes and the IOU 20. The MPX 28 is a device which receives a signal received from the IO port 21 or the IO port 27, transmits this signal to the controller 14 via the SMBus 40, and transmits to the IO port 21 or the IO port 27 a signal received from the controller 14. Each of the connectors 23 to 26 is, for example, a PCI-Express output port.

An Interrupt pin is assigned to the IO port 27. The MMB 10 can determine the established or nonestablished state of cable connection between the IOU 20 and one of the PCI_Boxes on the basis of the bit logic on the interrupt pin.

When one PCI_Box is newly connected to the IOU 20 by cable connection, the IO port 27 transmits the connection interrupt signal to the MMB 10 via the connection interrupt signal line 34. The IO port 27 also transmits information on the bit logic on the interrupt pin to the controller 14 via the MPX 28 and the SMBus 40.

The IOU 20 is connected to each PCI_Box by a PCI_Box connection cable 30 formed of a main signal line 31, a Config signal line 32 and a connection interrupt signal line 33.

The main signal line 31 is used when a main signal is transmitted from the IO DV/RV 22 to one of the PCI_Boxes. The Config signal line 32 is used when a Config signal (CFG. 0, 1, 2, or 3 shown in FIG. 2) which is a control signal transmitted from the IO port 21 is transmitted to one of the PCI_Boxes. The connection interrupt signal line 33 is a signal line for detection of a state where one of the PCI_Boxes is connected to one of the connectors of the IOU.

The Config signal is a connection setting signal indicating which PCI_Box is to be connected to the IOU 20. The Config signal is transmitted from the IO port 21 to each PCI_Box under the control of the controller 14 in the MMB 10.

Each of the PCI_Box (#0) 2 and the PCI_Box (#N) 3 has connectors 201 and 204, an IO DV/RV 202 and an IO port 203.

The connector 201 is connected to the IOU 20 by the PCI_Box connection cable 30. A PCI card is connected to the IO DV/RV 202.

The IO port 203 is capable of bidirectional communication with the controller 14 in the MMB 10 via the IOU 20. The IO port 203 is also capable of direct bidirectional communication with the MMB 10 via a PCI_Box connection cable 41.

The IO port 203 includes a register for a plurality of bits. When the IO port 203 receives the Config signal from the IOU 20, it inverts the logic of a bit at the position according to the connected relationship between the connector in the IOU 20 and the connector 201.

In the example shown in FIG. 2, the connector 201 in the PCI_Box (#0) 2 is connected to the connector 25 in the IOU 20. Accordingly, when the IO port 203 receives CFG. 2 from the port 21, it inverts the logic of the bit at the position according to the connected relationship between the connector 25 and the connector 201 (for example, the third bit from the lowermost place) from "0" to "1".

The IO port 203 transmits an interrupt signal indicating that the logic of the bit in the register has been changed to the IO port 16 via an interrupt signal line 42. The IO port 16 transmits the interrupt signal to the controller 13 via the MPX 15 and an SMBus 46.

The controller 13 reads the logic of the bit in the register of the IO port 203 through the SMBus 46 and an SMBus 44.

The IO port 203 transmits the logic of the bit in the register as register information to the controller 13 via the SMBus 44 and the SMBus 46.

The controller 13 compares the received register information with the information on the settings of connections between the IOU 20 and the PCI_Box held in advance in the connection setting information storage unit 18 in the MMB 10. If a match occurs between the register information and the connection setting information, the controller 13 establishes the connection between the IOU 20 and the corresponding PCI_Box.

The connector 204 is connected to the connector 17 in the MMB 10 by the PCI_Box connection cable 41 formed of the SMBus 44, the interrupt signal line 42 and the connection interrupt signal line 43.

The SMBus 44 is a signal line used when a signal is transmitted or received between the MMB 10 and one of the PCI_Boxes. The interrupt signal line 42 is a signal line used when an interrupt signal is transmitted from one of the PCI_Boxes to the MMB 10 in a case where the logic of the bit in the register of the IO port 203 is changed.

The connection interrupt signal line 43 is a signal line used when, in a case where one PCI_Box is newly connected to the MMB 10 by cable connection or disconnected from the MMB 10 by cable disconnection, the connection interrupt signal is transmitted to the MMB 10 from the PCI_Box newly connected to the MMB 10 by cable connection or disconnected from the MMB 10 by cable disconnection.

In the first embodiment of the present invention, the IO port 21 in the IOU 20 is capable of bidirectional communication with the controller 14 in the MMB 10 and also capable of bidirectional communication with the IO port 203 in each PCI_Box via the Config signal line 32.

The IO port 203 in each PCI_Box is substantially capable of bidirectional communication with the IO port 21 in the IOU 20 if a setting for transmission or reception is made on a bit-by-bit basis, and is also capable of bidirectional communication with the controller 13 in the MMB 10 via the SMBuses 44 and 46.

According to the first embodiment of the present invention, when no response to a signal transmitted in the loop of a communication path is returned, return communication can be performed in the communication path in which bidirectional communication can be performed. It is, therefore, possible to easily locate a fault point in the loop of the communication path when a communication abnormality occurs.

For example, a case is supposed in which when the control signal is transmitted from the controller 14 in the MMB 10 to the IO port 21 of the IOU 20, a response to the control signal is returned from the IOU 20 to the controller 14 but no response to the control signal transmitted from the controller 14 to the IO port 203 in the PCI_Box (#0) 2 via the IO port 21 is returned from the PCI_Box (#0) 2.

In this case, the control signal is transmitted from the controller 13 in the MMB 10 to the IO port 203 in the PCI_Box (#0) 2 via the SMBuses 46 and 44. If a response to the control signal is returned, it is found that the fault point corresponding to the cause of the communication abnormality exists in the communication path between the IOU 20 and the PCI_Box (#0) 2.

Also, for example, a case is supposed in which when no response to the control signal transmitted from the controller 13 in the MMB 10 to the IO port 203 in the PCI_Box (#0) 2 via the SMBuses 46 and 44 is returned.

In this case, if a response to the control signal transmitted from the controller 14 in the MMB 10 to the IO port 203 in the PCI_Box (#0) 2 via the IOU 20 is returned from the IO port 203, it is found that the fault point corresponding to the cause of the communication abnormality exists in the communication path between the MMB 10 and the PCI_Box (#0) 2.

The second embodiment of the present invention will next be described with reference to FIG. 3. In an IO device connection recognition system shown in FIG. 3, each of PCI_Boxes has a plurality of PCIUs as an IO expansion module adapted for partioning. Cables are connected on a PCIU-by-PCIU basis at the time of connection between the IOU 20 and the PCI_Box.

The second embodiment will first be outlined. The MMB 10 transmits a connection setting signal for setting a connection between the IOU 20 and one of the PCIUs in one of the PCI_Boxes to the PCI_Box via the IOU 20. In the PCI_Box, the connection setting signal is transmitted to a device capable of bidirectional communication in the PCI_Box (IO port 203 in the system shown in FIG. 3) via the PCIU connected to the IOU 20.

The device capable of bidirectional communication in each PCI_Box includes a register for a plurality of bits. When the device capable of bidirectional communication in the PCI_Box receives the connection setting signal from the IOU 20, it stores an bit logic information which is the information on the logic of the bit at the position according to the ID number for the PCIU connected to the IOU 20, in the register.

The device capable of bidirectional communication in the PCI_Box transmits the bit logic information stored in the register as register information to the MMB 10.

The MMB 10 compares the register information received from the device capable of bidirectional communication in the PCI_Box with information set in advance in the MMB 10 as information on a setting of connection between the IOU 20 and the PCIU.

If the register information and the information on the setting of connection between the IOU 20 and the PCIU match each other, the MMB 10 determines that the connection between the computer main unit 1 and the PCIU is normal and that communication between the computer main unit 1 and the PCIU can be started. If the register information and the information on the setting of connection between the IOU 20 and the PCIU do not match each other, the MMB 10 determines that the connection between the computer main unit 1 and the PCIU is abnormal and that communication between the computer main unit 1 and the PCI_Box cannot be started.

The second embodiment of the present invention will be described more concretely. As shown in FIG. 3, the PCI_Box (#0) 5 includes PCIUs (#0) 51 to (#3) 54, and the PCI_Box (#N) 7 includes PCIUs (#0) 55 to (#3) 56. Each PCIU includes a connector 201 and an IO DV/RV 202.

An IO port 203 in each PCI_Box is an input/output port independent of partitions. The IO port 203 includes a register for a plurality of bits. When the IO port 203 receives a Config signal from the IOU 20 via the PCIU connected to the connector in the IOU 20, it inverts the logic of a bit at the position according to the connected relationship between the PCIU and the connector in the IOU 20.

The IO port 203 also transmits an interrupt signal to the port 16 of the MMB 10 via an interrupt line 42 to notify the inversion of the logic of the bit in the register.

When the IO port 203 receives from the controller 13 a request for read from the register in the IO port 203, it transmits the information on the logic of the bit in the register as register information to the controller 13.

The controller 13 in the MMB 10 compares the register information received from the port 203 with information set in advance in the connection setting information storage unit 18 in MMB 10 as information on settings of connections between the IOU 20 and the PCIUs in the PCI_Boxes (hereinafter referred to as "connection setting information").

If a match occurs between the register information and the connection setting information, the controller 13 determines that the connection between the IOU 20 and the corresponding PCIU is normal and enables initiation of communication with the PCIU.

If no match occurs between the register information and the connection setting information, the controller 13 determines that the connection between the IOU 20 and the corresponding PCIU is abnormal and disables initiation of communication with the PCIU.

Figure 3:
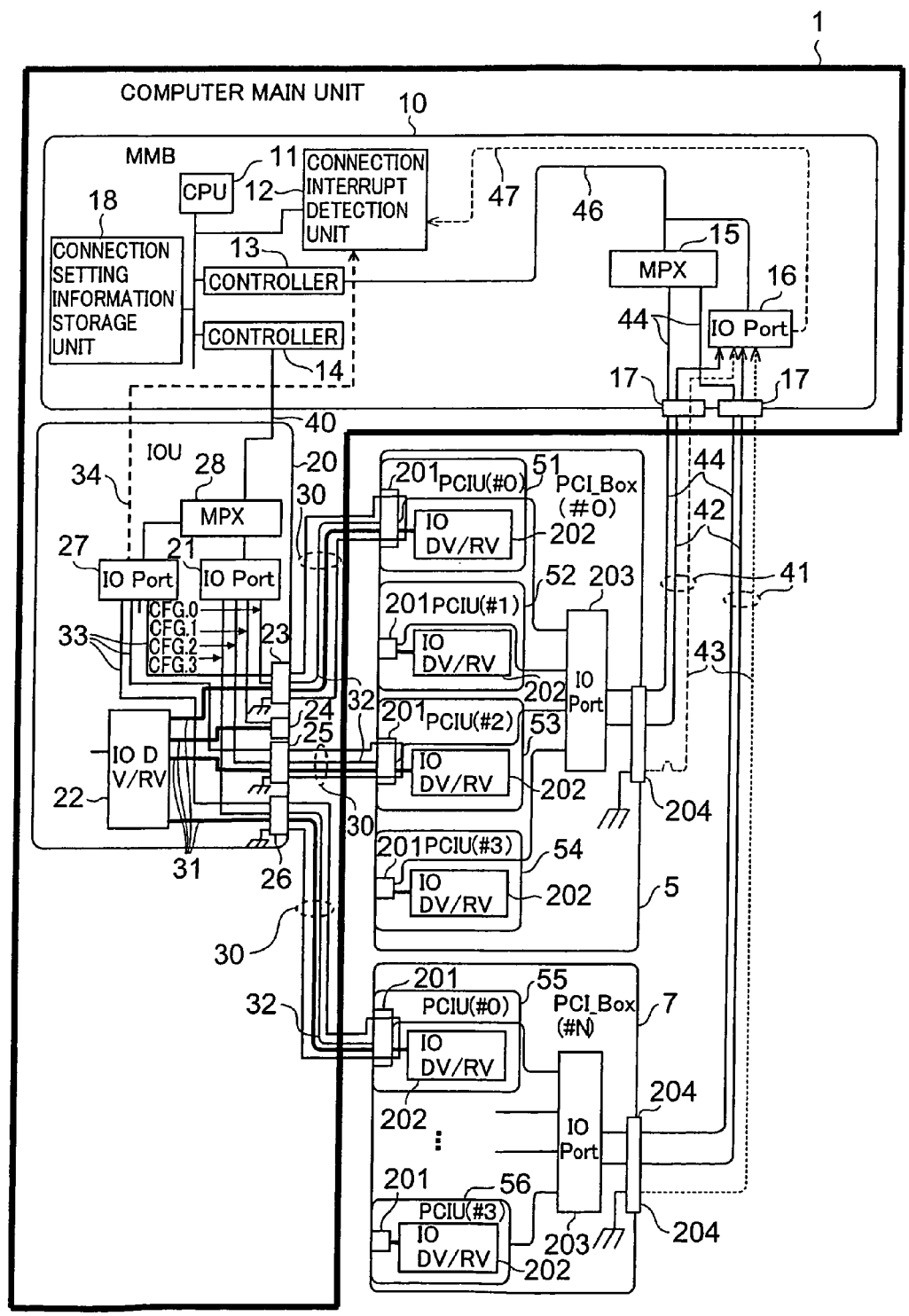
FIG. 3 is a diagram showing an example of a configuration of another IO device connection recognition system in accordance with the present invention.

In the system configuration shown in FIG. 3, the PCI_Box connection cable 30 is formed of a main signal line 31, a Config signal line 32 and a connection interrupt signal line 33. Therefore, it is possible to prevent erroneous insertion/removal of the cables, for example, insertion or removal of the main signal line 31 only or omission of insertion or removal of the Config signal line 32. That is, insertion of the PCI_Box cable 30 into the connector enables the MMB 10 to start monitoring the states of connections between the IOU 20 and the PCIUs. Therefore, the reliability of cable connection is improved.

Figure 4:
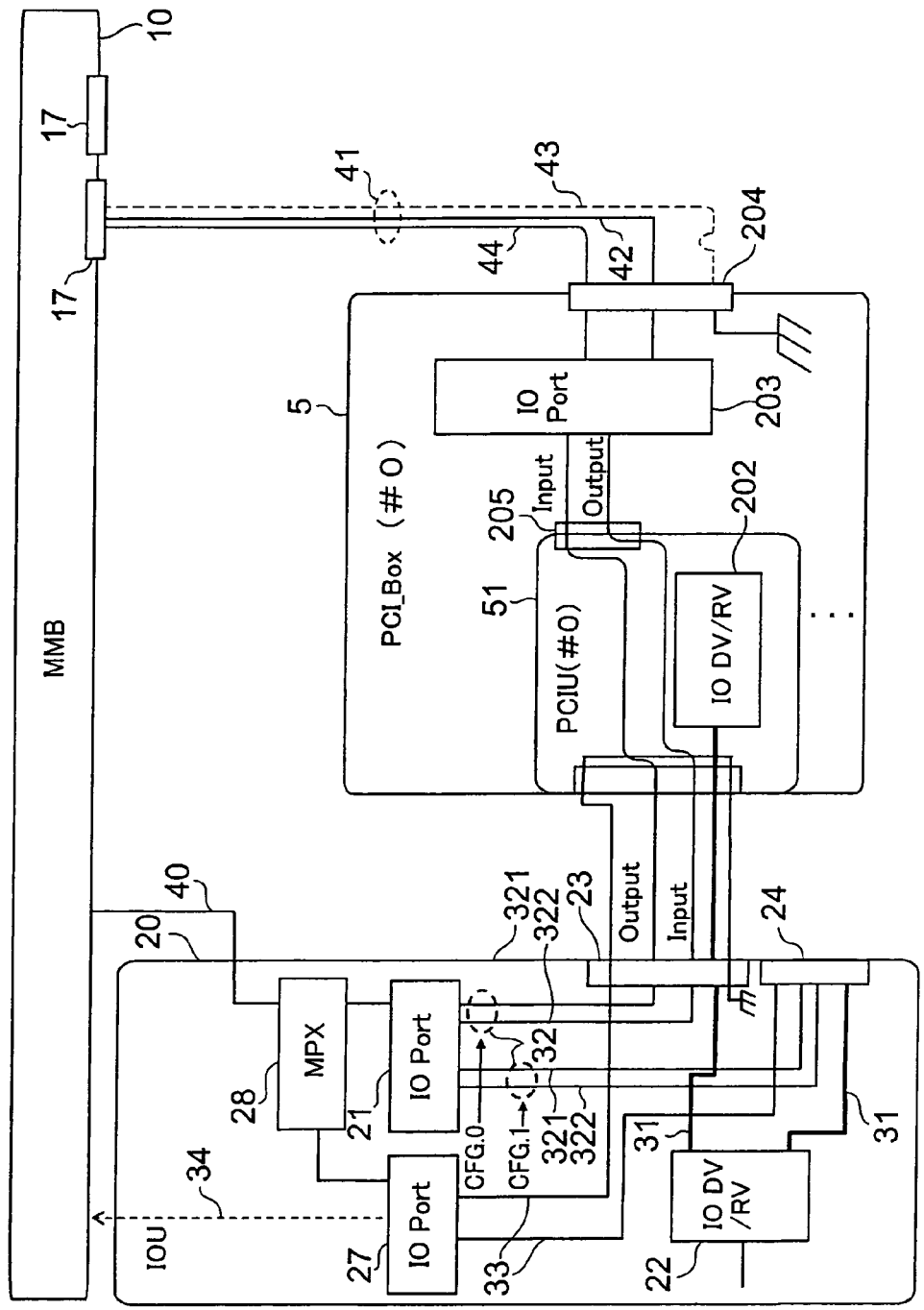
FIG. 4 is a diagram showing details of the connection between the IOU and PCI_Box (#0).

FIG. 4 is a diagram showing details of the connection between the IOU 20 and the PCI_Box (#0) 5. An input pin and an output pin are assigned to each of the IO port 21 in the IOU 20 and the IO port 203 in the PCI_Box (#0) 5.

The Config signal line 32 is formed of two signal lines. One of the signal line is an output signal line 312 between the output pin of the IO port 21 and the input pin of the IO port 203, and the other of the signal line is an input signal line 322 between the input pin of the IO port 21 and the output pin of the IO port 203. Reference numerals 205 indicate a connector.

The MMB 10 can make a request for read from the resistor in the IO port 203 in the PCI_Box (#0) 5 through the SMBus 40 and the output signal line 321 and obtain the register information from the IO port 203 through the input signal line 322 and the SMBus 40.

The MMB 10 can also obtain the register information from the IO port 203 through the SMBus 44.

Thus, the MMB 10 can directly read the register information from the IO port 203 in each PCI_Box and can also read the register information from the IO port 203 via the IOU 20.

The second embodiment of the present invention will be described in further detail. Preferably, in the second embodiment of the present invention, each of the IO port 21 in the IOU 20 and the IO port 203 in each PCI_Box incorporates, for example, an 8-bit register. The IOU 20 is capable of connecting to, for example, four PCIUs with respect to each PCI_Box. Accordingly, four Config signals at the maximum can be transmitted from the IOU 20 to each PCI_Box.

Figure 5:
FIG. 5 is a diagram showing an example of a data configuration in the connection setting information storage unit in the MMB.

FIG. 5 is a diagram showing an example of a data configuration in the connection setting information storage unit in the MMB. The connection setting information shown in FIG. 5 has a data configuration including a Config signal, an ID number for each PCI_Box connected to the IOU 20 and an ID number for each PCIU connected to the IOU 20.

For example, the Config signal in a case where the IOU 20 and the PCIU (#0) 51 in the PCI_Box (#0) 5 are connected is CFG. 0.

The controller 14 in the MMB 10 transmits the control signal to the IO port 21 via the SMBus 40 to invert the logic of the bit in the register of the IO port 21 from 0 to 1 for example. The Config signal corresponding to the logic-inverted bit is transmitted from the IO port 21 to the PCIU in the PCI_Box through the Config signal line 32.

For example, if the controller 14 inverts the logic of bit 0 which is a bit in the lowermost place in the register of the IO port 21 from 0 to 1, CFG. 0 is transmitted to the PCIU connected to the connector 23. If, for example, the controller 14 inverts the logic of bit 1 which is a second bit from the lowermost place in the register of the IO port 21 from 0 to 1, CFG. 1 is transmitted to the PCIU connected to the connector 24.

Also, if, for example, the controller 14 inverts the logic of bit 2 which is a third bit from the lowermost place in the register of the IO port 21 from 0 to 1, CFG. 2 is transmitted to the PCIU connected to the connector 25.

Also, if, for example, the controller 14 inverts the logic of the fourth bit 3 from the lowermost place in the register of the IO port 21 from 0 to 1, CFG. 3 is transmitted to the PCIU connected to the connector 26.

A description will next be made of information on the register of the IO port 203 incorporated in each PCI_Box. One bit is assigned to the IO port 203 with respect to each Config signal transmitted from the IOU 20 via one of the PCIUs.

For example, to the Config signal transmitted from the IOU 20 to the IO port 203 via the PCIU (#0) 51, the bit 0, which is the bit in the lowermost place in the eight bits assigned to the register of the IO port 203, is assigned.

To the Config signal transmitted from the IOU 20 to the IO port 203 via the PCIU (#1) 52, the bit 1, which is the second bit from the lowermost place, is assigned. To the Config signal transmitted from the IOU 20 to the IO port 203 via the PCIU (#2) 53, the bit 2, which is the third bit from the lowermost place, is assigned. To the Config signal transmitted from the IOU 20 to the IO port 203 via the PCIU (#3) 54, the bit 3, which is the fourth bit from the lowermost place, is assigned.

When the Config signal is transmitted to the IO port 203 via one of the PCIUs, the logic of the bit in the register of the IO port 203 is inverted from 0 to 1 for example.

For example a description will be made of processing performed by the MMB 10 to determine the connection between the connector 23 of the IOU 20 and the PCIU (#0) 51 in the PCI_Box (#0) 5. It is assumed that all the bits of each of the information on the register of the port 21 in the IOU 20 and the information on the register of the IO port 203 in the PCI_Box (#0) 5 are zero, that is, the information is "00000000" in the first place.

Figure 6:
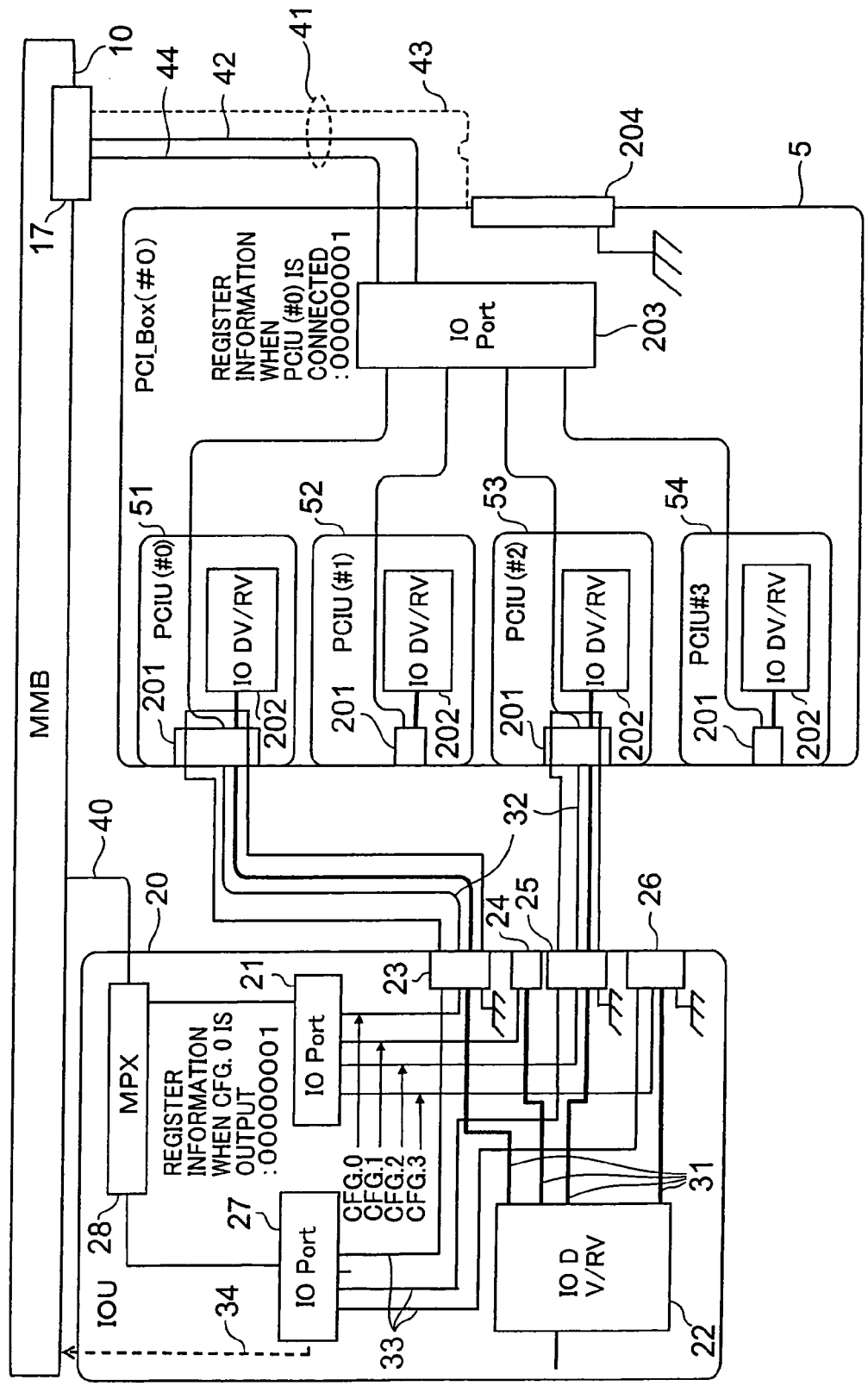
FIG. 6 is a diagram for explaining processing for determining the connection between the connector of the IOU and PCIU (#0) in PCI_Box (#0).

The controller 14 in the MMB 10 transmits the control signal to the IOU 20 through the SMBus 40 to invert the logic of the bit 0 in the register of the IO port 21 in the IOU 20 from 0 to 1. The register information at this time is "00000001", as shown in FIG. 6.

The IO port 21 transmits CFG. 0 to the PCIU connected to the IOU 20 by the connector 23. CFG. 0 transmitted from the IO port 21 is transmitted to the IO port 203 via the PCIU connected to the connector 23. For example, in a case where the PCIU (#0) 51 is correctly connected to the connector 23, CFG. 0 is transmitted to the IO port 203 via the PCIU (#0) 51.

When the IO port 203 receives CFG. 0 via the PCIU (#0) 51, it inverts the logic of the bit 0 in the register from 0 to 1. The register information in the IO port 203 at this time is "00000001", as shown in FIG. 6.

The IO port 203 transmits the interrupt signal indicating that the logic of the bit in the register has been changed to the IO port 16 in the MMB 10 through the interrupt signal line 42. The IO port 16 transmits the interrupt signal to the controller 13 through the SMBus 46.

The controller 13 receives the interrupt signal and reads the register information from the IO port 203 in the PCI_Box (#0) 5 through the SMBus 46 and the SMBus 44.

The IO port 203 transmits, for example, the register information "00000001" to the controller 13 through the SMBus 44 and the SMBus 46.

The controller 13 compares the register information received from the IO port 203 with the connection setting information set in advance in the connection setting information storage unit 18 of the MMB 10.

For example, if the MMB 10 is holding the connection setting information in the connection setting information storage unit 18 shown in FIG. 5, the Config signal in the case of connecting the IOU 20 and the PCIU (#0) 51 in the PCI_Box (#0) 5 is CFG. 0. CFG. 0 is a connection setting signal by which the logic of the bit in the lowermost place in the register of the IO port 203 of the IOU 20 is inverted from 0 to 1 if the PCIU (#0) 51 is correctly connected to the IOU 20.

Accordingly, the register information received from the IO port 203 and the connection setting information match each other. Therefore the controller 13 determines that the PCIU (#0) 51 is correctly connected to the IOU 20.

In a case where the PCIU (#0) 51 is not connected to the connector 23 while the PCIU (#1) 52 is erroneously connected to the connector 23, CFG. 0 is transmitted from the IO port 21 in the IOU 20 to the IO port 203 via the PCIU (#1) 52.

The IO port 203 in the PCI_Box (#0) 5 inverts the bit 1 in the register from 0 to 1. The register information then transmitted from the IO port 203 to the controller 13 in the MMB 10 is "00000010".

In the connection setting information storage unit 18 shown in FIG. 5, the Config signal in the case of connecting the IOU 20 and the PCIU (#0) 51 in the PCI_Box (#0) 5 is CFG. 0. CFG. 0 is a connection setting signal by which the logic of the bit in the lowermost place in the register of the IO port 203 of the IOU 20 is inverted from 0 to 1 if the PCIU (#0) 51 is correctly connected to the IOU 20.

Accordingly, the register information received from the IO port 203 and the connection setting information do not match each other. Therefore the controller 13 determines that the connection between the PCIU (#0) 51 and the IOU 20 is abnormal and disables initiation of communication. At this time, the controller 13 issues an alarm indicating the occurrence of the connection abnormality.

The MMB 10 performs the above-described procedure with respect to each PCIU in all the PCI_Boxes to recognize the connected relationships between the IOU 20 and the PCIUs in the entire system. If there is no problem with the connections between the IOU and the PCIUs, the main IO signal is transmitted from the computer main unit 1 to each PCIU.

When a particular one of the PCIUs is connected or disconnected while the connections of the PCIUs in operation with the computer main unit 1 are being maintained, the MMB 10 determines only the connection between the IOU 20 and the PCIU to be connected or disconnected.

For example, in a case where the IOU 20 and the PCIU (#2) 53 are newly connected to each other while the connection between the IOU 20 and the PCIU (#0) 51 in the PCI_Box (#0) 5 is established, the MMB inverts the logic of the bit 2 in the register of the IO port 21 in the IOU 20 from 0 to 1 according to the connection setting information in the connection setting information storage unit 18 shown in FIG. 5.

When the logic of the bit 2 in the register of the IO port 21 is inverted from 0 to 1, CFG. 2 is transmitted from the IO port 21 to the PCI_Box (#0) 5. The MMB 10 then reads the register information from the IO port 203 in the PCI_Box (#0) 5 and checks whether or not the register information and the connection setting information match each other.

For example, when the PCIU (#0) 51 in the PCI_Box (#0) 5 is disconnected from the IOU 20, the MMB 10 reads the register information from the IO port 203 in the PCI_Box (#0) 5. The MMB 10 then confirms the completion of inversion of the logic of the bit 0 from 1 to 0 to recognize the completion of disconnection of the PCIU (#0) 51 from the IOU 20.

In the second embodiment, the MMB 10 recognizes connection or disconnection between the IOU 20 and one of the PCIUs by comparing the register information received from the IO port 203 in the PCI_Box with connection setting information set in advance.

According to the second embodiment, connection or disconnection between the IOU 20 and the PCI_Boxes can be realized on a partition-by-partition basis. Also, prevention of erroneous connection between the IOU 20 and the PCI_Boxes can be achieved with respect to each partition.

Also, according to the second embodiment, when a connection between the computer main unit 1 and the PCI_Boxes is added or removed, the connection or disconnection corresponding to a partition to be added or removed can be performed, while the connections with respect to the partitions in operation are being maintained.

The third embodiment of the present invention will be described. In the third embodiment, when the MMB 10 and one PCI_Box are connected or disconnected by cable connection or cable disconnection, the MMB 10 makes a determination as to which PCI_Box is connected to or disconnected from the MMB 10 by capable connection or cable disconnection.

When one of the PCI_Boxes is newly connected to the IOU 20 by cable connection while no setting of connection between the IOU 20 and the PCI_Box is made by the MMB 10, the MMB 10 prepares connection setting information and then establishes the connection between the IOU 20 and one of the PCIUs in the PCI_Box newly connected by cable connection.

The third embodiment will first be outlined. In the third embodiment of the present invention, a first connection interrupt signal line (connection interrupt signal line 43 in FIG. 3) for detecting the state of cable connection between the MMB 10 and the PCI_Boxes is provided in each of the communication paths for direct connection between the MMB 10 and the PCI_Boxes shown in FIG. 3.

An interrupt pin of a plurality of bits indicating by a bit logic the state of cable connection between the MMB 10 and the PCI_Box detected is assigned to the device capable of bidirectional communication in the MMB 10 (IO port 16 in FIG. 3).

A second connection interrupt signal line (connection interrupt signal line 33 in FIG. 3) for detecting the state of cable connection between the IOU 20 and the PCIUs in the PCI_Boxes is also provided in each of the communication paths for connection between the IOU 20 and the PCI_Boxes. An interrupt pin of a plurality of bits indicating by a bit logic the state of cable connection between the IOU 20 and the PCIU in the PCI_Box detected is assigned to the device capable of bidirectional communication in the IOU 20 (IO port 27 in FIG. 3).

A third connection interrupt signal line (connection interrupt signal line 34 in FIG. 3) used for notification of the occurrence of cable connection or cable disconnection between the IOU 20 and the PCIUs from the IOU to the MMB 10 is also provided.

When the MMB 10 and one of the PCI_Boxes are connected or disconnected by cable connection or cable disconnection, the PCI_Box transmits the connection interrupt signal to the MMB 10 through the connection interrupt signal line 43.

The MMB 10 determines which PCI_Box has been connected to or disconnected from the MMB 10 by cable connection or cable disconnection on the basis of the bit logic on the interrupt pin assigned to the IO port 16 in the MMB 10.

In the third embodiment, when the IOU 20 and the PCIU are connected or disconnected by cable connection or cable disconnection, the bit logic on the interrupt pin assigned to the IO port 27 is changed according to the state of cable connection between the IOU 20 and the PCIU detected through the connection interrupt signal line 33. The IOU 20 sends the connection interrupt signal to the MMB 10 via the connection interrupt signal line 34.

The MMB 10 determines which PCIU has been connected to or disconnected from the IOU 20 by cable connection or cable disconnection on the basis of the bit logic on the interrupt pin assigned to the IO port 27 in the IOU 20.

In a case where one PCIU which is not identified from the connection setting information on the settings of connections between the IOU 20 and the PCIUs in the MMB 10 is newly connected to the IOU by cable connection, the MMB 10 establishes the connection between the PCIU and the IOU, as described below.

That is, the MMB 10 makes a setting of connection between the IOU 20 and the PCIU newly connected to the IOU 20 by cable connection, and then transmits the connection setting signal to the PCI_Box via the IOU 20.

In the PCI_Box, the connection setting signal is transmitted to the IO port 203 in the PCI_Box via the PCIU newly connected to the IOU 20 by cable connection.

When the IO port 203 in the PCI_Box receives the connection setting signal from the IOU 20, it stores in the register the information on the logic of the bit at the position according to the ID number for the PCIU newly connected to the IOU 20 by cable connection, and transmits the bit logic information stored in the register as register information to the MMB 10.

The MMB 10 compares the register information received from the IO port 203 in the PCI_Box with the information in the MMB 10 on the setting of connection between the IOU 20 and the PCIU newly connected to the IOU by cable connection.

If the register information received from the IO port 203 in the PCI_Box and the information in the MMB 10 on the setting of connection between the IOU 20 and the PCIU newly connected to the IOU 20 by cable connection match each other, the MMB 10 determines that communication between the computer main unit 1 and the PCIU newly connected to the IOU 20 can be started. If the register information and the connection setting information do not coincide with each other, the MMB 10 determines that communication between the computer main unit 1 and the PCIU newly connected to the IOU 20 cannot be started.

The third embodiment of the present invention will be described more concretely. Referring to FIG. 3, an interrupt pin of a plurality of bits is assigned to the IO port 27. A bit logic on the interrupt pin exists with respect to each of the cable connection relationships between the connectors in the IOU 20 and the PCIUs.

For example, the cable connection relationship between the connector 23 and one of the PCIUs can be determined from the logic of the bit in the lowermost place. The cable connection relationship between the connector 24 and one of the PCIUs can be determined from the logic of the second bit from the lowermost place. The cable connection relationship between the connector 25 and one of the PCIUs can be determined from the logic of the third bit from the lowermost place. The cable connection relationship between the connector 26 and one of the PCIUs can be determined from the logic of the fourth bit from the lowermost place.

When one of the connectors in the IOU 20 and one of the PCIUs are connected by cable connection, the logic at the bit position according to the cable connection relationship is "1". When the connector and the PCIUs are disconnected by cable disconnection, the logic is "0". From the PCIU connected to the connector in the IOU 20 by cable connection, the ID number for the PCI_Box to which the PCIU belongs and the ID number for the PCIU are transmitted to the controller 14 through the Config signal line 32 and the SMBus 40.

For example, as shown in FIG. 3, the connector 23 in the IOU 20 and the PCIU (#0) 51 in the PCI_Box (#0) 5, the connector 25 and the PCIU (#2) 53 in the PCI_Box (#0) 5, and the connector 26 and the PCIU (#0) 55 in the PCI_Box (#N) 7 are newly connected by cable connection.

The bit logic on the interrupt pin of the IO port 27 is "0000" before the establishment of the cable connection, but it is changed into "1011" after the cable connection.

When the bit logic on the interrupt pin is changed, the IO port 27 transmits the connection interrupt signal to the connection interrupt detection unit 12 through the connection interrupt signal line 34.

Also, the ID number "#0" for the PCI_Box (#0) 5 and the ID number "#0" for the PCIU (#0) 51 are transmitted from the PCIU (#0) 51 to the controller 14. The ID number "#0" for the PCI_Box (#0) 5 and the ID number "#2" for the PCIU (#2) 53 are also transmitted from the PCIU (#2) 53 to the controller 14. The ID number "#N" for the PCI_Box (#N) 7 and the ID number "#0" for the PCIU (#0) 55 are also transmitted from the PCIU (#0) 55 to the controller 14.

The controller 14 newly prepares connection setting information with respect to each PCIU connected to the IOU 20 by cable connection, on the basis of the ID numbers for the PCIUs and the ID numbers for PCI_Boxes received. For example, the controller 14 prepares connection setting information such as those in the connection setting information storage unit 18 shown in FIG. 5.

The controller 14 transmits Config signals to the IO port 203 in the PCI_Box (#0) 5 and the IO port 203 in the PCI_Box (#N) 7 through the SMBus 40 and the PCI_Box connection cable 30 on the basis of the connection setting information newly prepared.

The controller 13 then compares the register information read from the IO port 203 in the PCI_Box (#0) 5 and the IO port 203 in the PCI_Box (#N) 7 with the connection setting information. The controller 13 confirms the coincidence between the register information read from the IO ports 203 in the PCI_Boxes and the connection setting information and establishes the connections between the IOU 20 and the PCIUs newly connected by cable connection.

According to the third embodiment, it is possible to determine which PCI_Box is connected to or disconnected from the MMB 10 by cable connection.

According to the third embodiment, when the IOU 20 and one PCI_Box are connected by cable connection, the connection interrupt signal is transmitted from the PCI_Box connected by cable connection to the MMB 10, thereby notifying the MMB 10 of the establishment of cable connection. According to the third embodiment, therefore, a malfunction or an accident due to an erroneous connection can be prevented.

The MMB 10 newly prepares connection setting information by recognizing the cable connection relationships between the IOU 20 and PCIUs, and thereafter transmits the Config signal to the PCI_Boxes via the IOU to establish the connections between the IOU 20 and the PCIUs. According to the third embodiment, therefore, the operability of the PCI_Box is improved.

Figure 7:
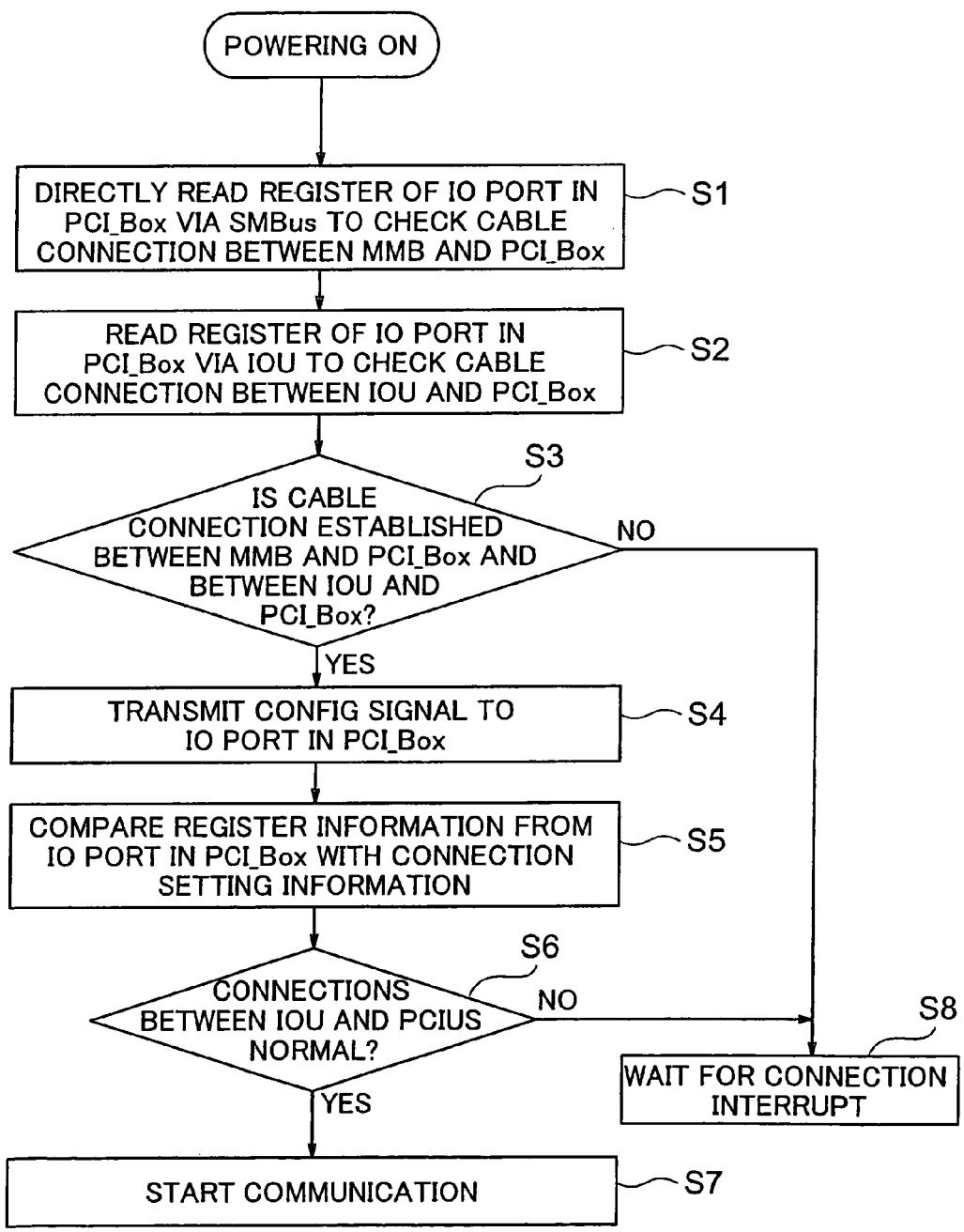
FIG. 7 is a diagram showing an example of a processing flow from powering on of the MMB to initiation of communication.

A description will be made of a flow of processing for recognizing IO device connection in accordance with the present invention. FIG. 7 is a diagram showing an example of a processing flow from powering on of the MMB to initiation of communication.

When the power for the MMB 10 is turned on, the MMB 10 directly reads the register of the IO port 203 in a PCI_Box via the SMBus 44 to check the cable connection between the MMB 10 and the PCI_Box (step S1).

Subsequently, the MMB 10 reads the register of the IO port 203 in the PCI_Box via the IOU 20 to check the cable connection between the IOU 20 and the PCI_Box (step S2).

The MMB 10 determines whether or not the cable connection is established between the MMB 10 and the PCI_Box and between the IOU and the PCI_Box (step S3).

For example, if the MMB 10 cannot read the register of the IO port 203 in the PCI_Box (#0) 5 via the SMBus 44, the cable connection is not established between the MMB 10 and the PCI_Box (#0) 5. If the MMB 10 can read the register of the IO port 203 in the PCI_Box (#0) 5 via the SMBus 44, the cable connection is established between the MMB 10 and the PCI_Box (#0) 5.

Also, for example, if the MMB 10 cannot read the register of the IO port 203 in the PCI_Box (#0) 5 via the IOU 20, the cable connection is not established between the IOU 20 and the PCI_Box (#0) 5. If the MMB 10 can read the register of the IO port 203 in the PCI_Box (#0) 5 via the IOU 20, the cable connection is established between the IOU 20 and the PCI_Box (#0) 5. The MMB 10 can read the register of the IO port 203 only when an output setting of the register pin of the IO port 203 is made.

The MMB 10 enters a connection interrupt waiting state if the cable connection is not established between the MMB 10 and the PCI_Box or between the IOU 20 and the PCI_Box (step S8).

If the cable connection is established between the MMB 10 and the PCI_Box and between the IOU 20 and the PCI_Box, the MMB 10 transmits a Config signal to the IO port 203 in the PCI_Box (step S4) and compares the register information from the IO port 203 in the PCI_Box with connection setting information (step S5).

The MMB 10 then determines whether or not the connection between the IOU 20 and any of the PCIUs is normal (step S6). If the register information from the IO port 203 in the PCI_Box and the connection setting information match each other, the MMB 10 determines that the connection between the IOU 20 and the PCIU is normal and enables initiation of communication between the computer main unit 1 and the PCIU (step S7).

If the register information from the IO port 203 in the PCI_Box and the connection setting information do not match each other, the MMB 10 determines that the connection between the IOU 20 and the PCIU is abnormal and enters the connection interrupt waiting state (step S8).

Figure 8:
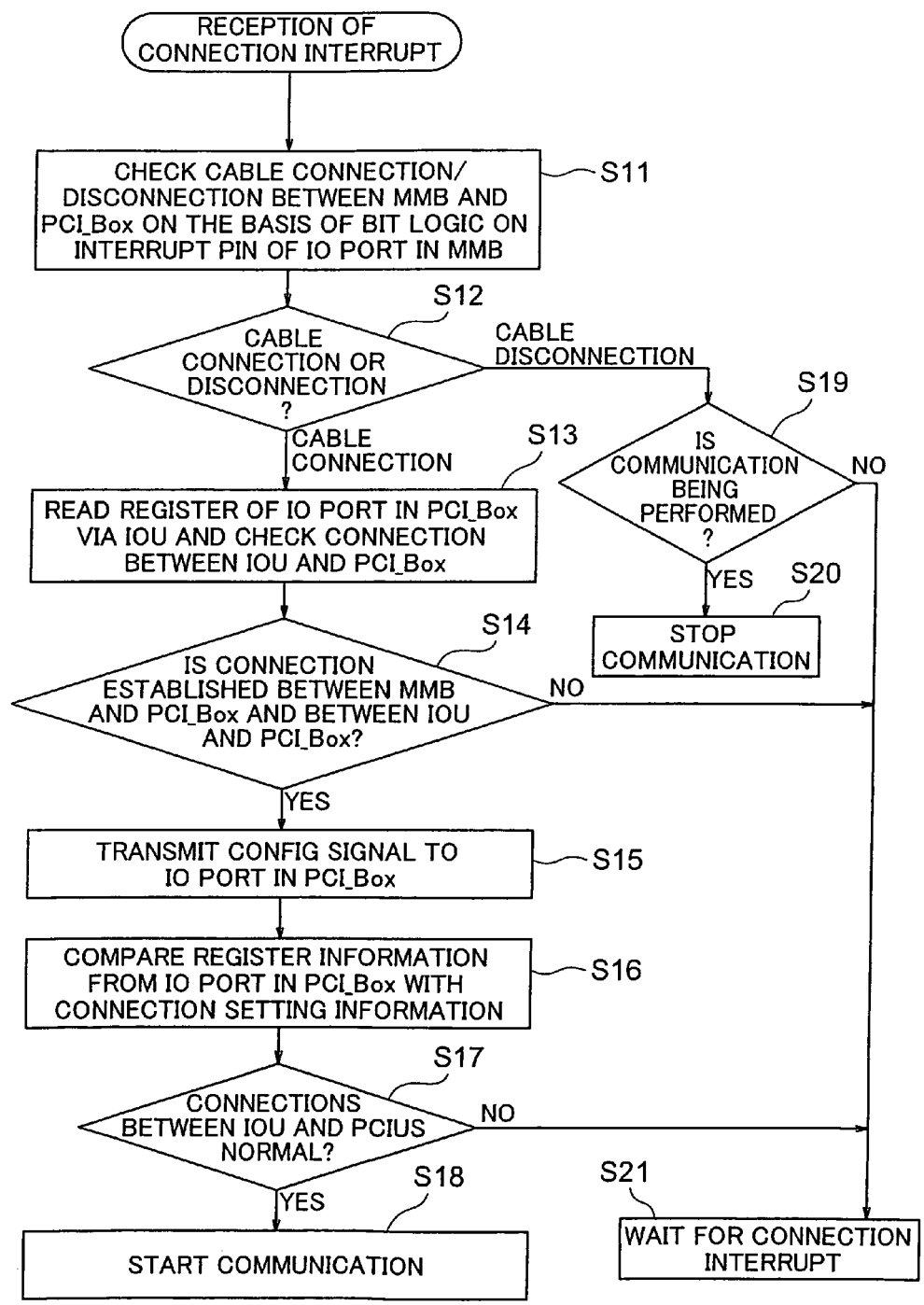
FIG. 8 is a flowchart showing an example of a processing flow when the MMB directly receives a connection interrupt from one PCI_Box.

FIG. 8 is a flowchart showing an example of a processing flow when the MMB directly receives a connection interrupt from one PCI_Box. The MMB 10 first checks cable connection/disconnection between the MMB 10 and the PCI_Box on the basis of the bit logic on the interrupt pin of the IO port 16 in the MMB 10 (step S11).

The MMB 10 determines whether the connection interrupt is by cable connection or cable disconnection (step S12). A bit logic on the interrupt pin exists with respect to each of the cable connection relationships between the MMP 10 and the PCI_Boxes. In a case where two bits are assigned to the interrupt pin, the cable connection relationship between the MMB 10 and the PCI_Box (#0) 5 can be identified, for example, from the logic of the bit logic in the lowermost place, and the cable connection relationship between the MMB 10 and the PCI_Box (#N) 7 can be identified, for example, from the logic of the second bit from the lowermost place.

That is, if the bit logic on the interrupt pin of the IO port 16 is changed from "00" to "01" for example, the MMB 10 determines that the MMB 10 and the PCI_Box (#0) 5 are connected by cable connection.

If the bit logic on the interrupt pin of the IO port is changed from "01" to "00" for example, the MMB 10 determines that the MMB 10 and the PCI_Box (#0) 5 are disconnected by cable disconnection.

If MMB 10 determines that the connection interrupt is by cable disconnection, it determines whether or not communication is being performed between the computer main unit 1 and the PCI_Box (step S19). If communication is not being performed between the computer main unit 1 and the PCI_Box, it enters the connection interrupt waiting state (step S21). If communication is being performed between the computer main unit 1 and the PCI_Box, it terminates communication (step S20).

If MMB 10 determines that the connection interrupt is by cable connection, it reads the register of the IO port 203 in the PCI_Box via the IOU 20 and checks the connection between the IOU 20 and the PCI_Box (step S13).

The MMB 10 then determines whether or not the connection is established between the MMB 10 and the PCI_Box and between the IOU 20 and the PCI_Box (step S14).

If the connection is not established between the MMB 10 and the PCI_Box or between the IOU 20 and the PCI_Box, the MMB 10 enters the connection interrupt waiting state (step S21).

If the connection is established between the MMB 10 and the PCI_Box and between the IOU 20 and the PCI_Box, the MMB 10 transmits a Config signal to the IO port 203 in the PCI_Box (step S15) and compares the register information from the IO port 203 in the PCI_Box with connection setting information (step S16).

The MMB 10 thereafter determines whether or not the connection between the IOU 20 and any of the PCIUs is normal (step S17). If the connection between the IOU 20 and any of the PCIUs is normal, the MMB 10 enables initiation of communication between the computer main unit 1 and the PCIU (step S18). If the MMB 10 determines that the connection between the IOU 20 and any of the PCIUs is abnormal, it enters the connection interrupt waiting state (step S21).

Figure 9:
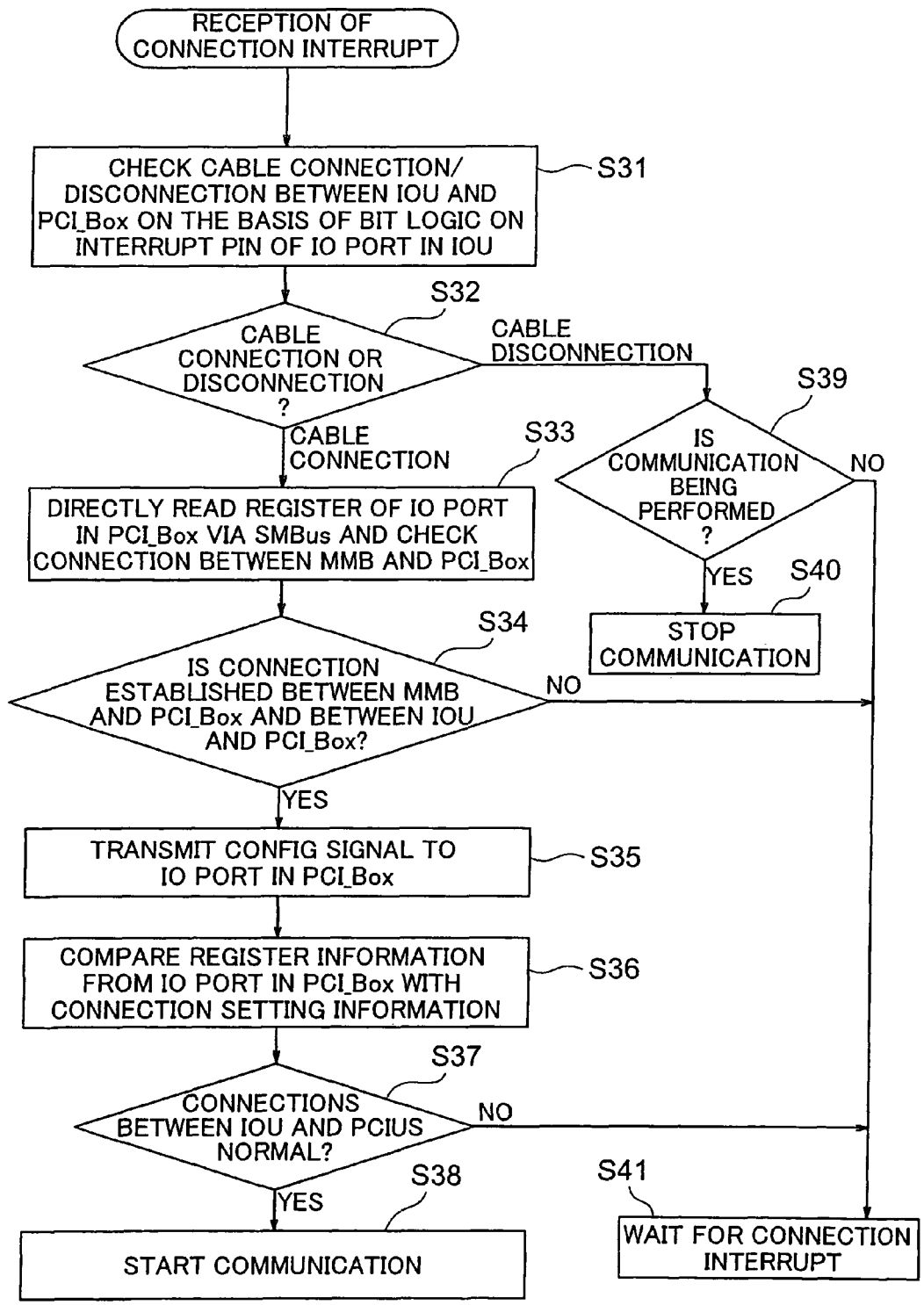
FIG. 9 is a diagram showing an example of a processing flow when the MMB receives a connection interrupt via the IOU.

FIG. 9 is a diagram showing an example of a processing flow when the MMB receives a connection interrupt via the IOU. The MMB 10 first checks cable connection/disconnection between the IOU 20 and one PCI_Box on the basis of the bit logic on the interrupt pin of the IO port 21 in the IOU 20 (step S31).

The MMB 10 determines whether the connection interrupt is by cable connection or cable disconnection (step S32). If the bit logic on the interrupt pin of the IO port 21 is changed from "0000" to "0001" for example, the MMB 10 determines that the IOU 20 and the PCI_Box (#0) 51 are connected. If the bit logic on the interrupt pin of the IO port is changed from "0001" to "0000" for example, the MMB 10 determines that the IOU 20 and the PCI_Box (#0) 51 are disconnected.

If MMB 10 determines that the connection interrupt is by cable disconnection, it determines whether or not communication is being performed between the computer main unit 1 and the PCI_Box (step S39). If communication is not being performed between the computer main unit 1 and the PCI_Box, the MMB 10 enters the connection interrupt waiting state (step S41). If communication is being performed between the computer main unit 1 and the PCI_Box, the MMB 10 terminates communication (step S40).

If MMB 10 determines that the connection interrupt is by cable connection, it directly reads the register of the IO port 203 in the PCI_Box via the SMBus 44 and checks the connection between the MMB 10 and the PCI_Box (step S33).

The MMB 10 then determines whether or not the connection is established between the MMB 10 and the PCI_Box and between the IOU 20 and the PCI_Box (step S34).

If the cable connection is not established between the MMB 10 and the PCI_Box or between the IOU 20 and the PCI_Box, the MMB 10 enters the connection interrupt waiting state (step S41).

If the cable connection is established between the MMB 10 and the PCI_Box and between the IOU 20 and the PCI_Box, the MMB 10 transmits a Config signal to the IO port 203 in the PCI_Box (step S35) and compares the register information from the IO port 203 in the PCI_Box with connection setting information (step S36).

The MMB 10 thereafter determines whether or not the connection between the IOU 20 and any of the PCIUs is normal (step S37). If the connection between the IOU 20 and any of the PCIUs is normal, the MMB 10 enables initiation of communication between the computer main unit 1 and the PCIU (step S38). If the MMB 10 determines that the connection between the IOU 20 and any of the PCIUs is abnormal, it enters the connection interrupt waiting state (step S41).

Examples of detection of abnormalities using the IO device connection recognition method in accordance with the present invention will be described.

First, a description is made referring to a detection of cable connection abnormality between MMB 10 and PCI_Box. For example, if the MMB 10 can directly read the register of the IO port 203 in each PCI_Box and can read the register information, it determines that the cable connection is established between the MMB 10 and the PCI_Box.

If the cable connection is not established between the MMB 10 and the PCI_Box, the MMB 10 cannot read the register information in the PCI_Box.

The MMB 10 can also detects a cable abnormality between the MMB 10 and the PCI_Boxes on the basis of the bit logic on the interrupt pin assigned to the IO port 16.

That is, if connector coming-off or cable disconnection occurs in the communication route for direct communication between the MMB 10 and the PCI_Boxes, the connection interrupt signal to the MMB 10 is generated. The MMB 10 determines that cable disconnection occurs between the MMB 10 and the PCI_Boxes on the basis of the bit logic on the interrupt pin assigned to the IO port 16.

Next, a description is made referring to a detection of cable connection abnormality between IOU 20 and PCIU. The cable connection abnormality between IOU 20 and PCIU can be determined on the basis of the bit logic on the interrupt pin assigned to the IO port 27 of the IOU 20.

When cable disconnection occurs between the IOU 20 and one PCIU, the connection interrupt signal is transmitted from the IO port 27 to the MMB 10.

The MMB 10 reads the bit logic on the interrupt pin assigned to the IO port 27 through the SMBus 40. For example, when the bit logic on the interrupt pin is changed from "1" to "0", the MMB 10 determines that the cable between the IOU 20 and the PCIU has been disconnected or come off.

For example, when the bit logic on the interrupt pin of the IO port 27 is "1", the MMB 10 determines that the cable is connected between the IOU 20 and the PCIU.

The MMB 10 may also determine that the cable connection between the IOU 20 and PCIUs is normal by confirming that the register information from the IO port 21 in the IOU 20 and the connection setting information in the MMB 10 match and that the register information from the IO port 203 in the PCI_Box and the connection setting information in the MMB 10 match.

Further, the MMB 10 may read register information from the IO port 203 in each PCI_Box on a PCIU-by-PCIU-basis via the IOU 20 and determine that the cable connection between the IOU 20 and the PCIU is normal by confirming that the read register value and connection information in the MMB 10 match.

A description is made referring to a detection of abnormality in PCI_Box or abnormality in Config signal output from IOU 20 as follows. The MMB 10 reads register information from the IO port 203 in each PCI_Box via the SMBus 44 and compares the register information with connection setting information in the MMB 10.

Also, the MMB 10 reads register information from the IO port 21 in the IOU 20 via the SMBus 40 and compares the register information with connection setting information in the MMB 10.

In a case where the register information from the IO port 21 in the IOU 20 and the connection setting information in the MMB 10 match each other, but the register information from the IO port 203 and the connection setting information in the MMB 10 do not match each other, the MMB 10 determines that an abnormality has occurred in the PCI_Box or in a Config signal output from the IOU 20.

A description will be made of the difference between a case where each PCI_Box is operated by being partitioned and a case where the PCI_Box is operated without being partitioned in the present invention. The process of transmitting a Config signal to the PCI_Box under the control of the MMB 10 is required regardless of use/nonuse of portioning.

There is no difference in terms of PCI_Box hardware between a case where the PCI_Box is operated by being partitioned and a case where the PCI_Box is operated without being partitioned. In a case where the PCI_Box is operated by being partitioned, the MMB 10 recognizes the connected state of the PCIUs and IOU 20. That is, partition management is performed not by the PCI_Box but by the MMB 10. Therefore, a firmware setting of the MMB 10 in a case where the PCI_Box is operated by being divided into a plurality of partitions differs from that in a case where the PCI_Box is operated without being divided.

What is claimed is:

1. A computer system, comprising:
    an IO (Input/Output) unit having a first connection interface;
    an IO expansion device to which at least an external IO device is connected; and
    a monitoring and control unit monitoring and controlling a connection between the IO unit and the IO expansion device, storing a connection setting information set in advance, the connection setting information indicating connection setting between the IO unit and the IO expansion device, and having a second connection interface and a third connection interface;
    wherein the IO expansion device is connected to the monitoring and control unit through the second connection interface directly, and is connected to the monitoring and control unit through the first connection interface, the IO unit and the third connection interface,
    wherein the monitoring and control unit transmits the connection setting information to the IO expansion device through the third connection interface, the IO unit and the first connection interface, receives connection state information that indicates a state of the connection between the IO expansion device and the IO unit and is set according to the received connection setting information, from the I/O expansion device through the second connection interface, compares the connection state information received from the IO expansion device and the connection setting information, and determines a state of the connection between the IO expansion device and the IO unit based on the comparison, and
    wherein the IO expansion device records the connection state information, and outputs the connection state information to the monitoring and control unit.

2. The computer system according to claim 1, wherein the IO expansion device records the connection state information when the IO expansion device receives the connection setting information.

3. The computer system according the claim 2, wherein each of the monitoring and control unit, the IO unit and the IO expansion device are capable of bidirectional communication between the other unit connected thereto.

4. A computer system, comprising:
    an IO (Input/Output) unit having a first connection interface;
    an IO expansion device to which at least an external IO device is connected; and
    a monitoring and control unit monitoring and controlling a connection between the IO unit and the IO expansion device, storing a connection setting information set in advance, the connection setting information indicating connection setting between the IO unit and the IO expansion device, and having a second connection interface and a third connection interface,
    wherein
        the IO expansion device is connected to the monitoring and control unit through the second connection interface directly, and is connected to the monitoring and control unit through the first connection interface, the IO unit and the third connection interface,
        the IO expansion device stores connection state information set in advance to indicate connection setting between the IO unit and the IO expansion device, and
        the monitoring and control unit transmits the connection setting information to the IO expansion device through the third connection interface, the IO unit and the first connection interface, receives connection state information that indicates a state of the connection between the IO expansion device and the IO unit and is set according to the received connection setting information, from the I/O expansion device through the second connection interface, compares the connection state information received from the IO expansion device and the connection setting information, and determines a state of the connection between the IO expansion device and the IO unit based on the comparison.

* * * * *

UNITED STATES PATENT AND TRADEMARK OFFICE
CERTIFICATE OF CORRECTION

| | | |
|---|---|---|
| PATENT NO. | : 8,015,321 B2 | Page 1 of 1 |
| APPLICATION NO. | : 12/153016 | |
| DATED | : September 6, 2011 | |
| INVENTOR(S) | : Shimazaki | |

It is certified that error appears in the above-identified patent and that said Letters Patent is hereby corrected as shown below:

Column 21, Line 26, in claim 1, delete "I/O" and insert -- IO --, therefor.

Column 21, Line 39, in claim 3, delete "the" and insert -- to --, therefor.

Column 22, Line 31, in claim 4, delete "I/O" and insert -- IO --, therefor.

Signed and Sealed this

Seventh Day of February, 2012

David J. Kappos
*Director of the United States Patent and Trademark Office*